(12) United States Patent
Rothenberg (10) Patent No.: US 9,051,107 B1
(45) Date of Patent: Jun. 9, 2015

(54) PORTADIPPER SYSTEMS

(71) Applicant: Brian Rothenberg, Gilbert, AZ (US)

(72) Inventor: Brian Rothenberg, Gilbert, AZ (US)

( * ) Notice: Subject to any disclaimer, the term of this patent is extended or adjusted under 35 U.S.C. 154(b) by 0 days.

(21) Appl. No.: 14/200,703

(22) Filed: Mar. 7, 2014

Related U.S. Application Data

(60) Provisional application No. 61/804,901, filed on Mar. 25, 2013.

(51) Int. Cl.
*B65D 81/00* (2006.01)
*F16M 11/00* (2006.01)

(52) U.S. Cl.
CPC ............. *B65D 81/00* (2013.01); *F16M 11/00* (2013.01)

(58) Field of Classification Search
CPC ...... A61C 19/006; A45C 11/16; F16M 11/00; B65D 81/00
See application file for complete search history.

(56) References Cited

U.S. PATENT DOCUMENTS

| 2,539,940 A | 1/1951 | Abramson |
| 2,222,741 A | 11/1960 | Edward |
| 5,732,862 A | 3/1998 | Bull |

*Primary Examiner* — Andrew Perreault
(74) *Attorney, Agent, or Firm* — RG Patent Consulting, LLC; Rachel Gilboy

(57) ABSTRACT

A portable condiment holder system having a portable condiment holder assembly including, a lid; a receptacle having a top portion, a bottom portion, a first finger mount coupled to the bottom portion sized to accommodate a middle finger on a hand of a user-consumer, a second finger mount coupled to the bottom portion sized to accommodate an index finger on the hand of the user-consumer, an inner-volume to store at least one condiment and at least one finger food; and a base comprising at least one slit. The lid, the receptacle, and the base form the portable condiment holder assembly. The portable condiment holder assembly permits the user-consumer to coat at least one finger food in the at least one condiment, without risking spilling the condiment on the user-consumer and on belongings while in in-use condition.

19 Claims, 5 Drawing Sheets

FIG. 5

PORTADIPPER SYSTEMS

CROSS-REFERENCE TO RELATED APPLICATION

The present application is related to and claims priority from prior provisional application Ser. No. 61/804,901, filed Mar. 25, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of condiment holders and more specifically relates to a portable condiment holder system.

2. Description of the Related Art

Many people in modern society dine on the go. Enjoying foods that are typically eaten with condiments such as ketchup, sauces or other types of flavorful dips can be extremely challenging, especially if dining in one's car or outdoors. Whether a business executive who grabs a quick hamburger and fries from the local drive-thru before heading into an afternoon business meeting, a child enjoying a snack of carrots on a school picnic, or even an avid sports fan munching on a hot pretzel at the big game, attempting to dip these foods into condiments such as ketchup, ranch dressing or cheese sauce can be extremely challenging unless one has a stable area on which to place the condiment container.

As can be imagined, walking into an important business meeting wearing pants that are stained by spilled ketchup can be embarrassing and unprofessional, while spilling a container of delectable caramel dipping sauce on the ground before one has had a chance to dunk even a single apple slice, can be downright frustrating. As such, many go without their favorite condiments when dining on the go, rather than risk the frustrating scenario of spilling the condiment all over themselves, their vehicle or other objects. This is not desirable.

Various attempts have been made to solve problems found in holding means art. Among these are found in: U.S. Pat. No. 5,732,862 to Charles L. Bull; U.S. Pat. No. 2,539,940 to Sam Abramson; and U.S. Pat. No. 2,222,741 to Edward M. Bush. This prior art is representative of holders. None of the above inventions and patents, taken either singly or in combination, is seen to describe the invention as claimed.

Ideally, a portable condiment holder system should be user-friendly and safe in-use and, yet would operate reliably and be manufactured at a modest expense. Thus, a need exists for a portable condiment holder system for holding ketchup, dipping sauce and similar condiments, with the receptacle (portable condiment holder assembly) configured to be worn over the fingers via a sturdy dual ring attachment and to avoid the above-mentioned problems.

BRIEF SUMMARY OF THE INVENTION

In view of the foregoing disadvantages inherent in the known of condiment holder device art, the present invention provides a novel portable condiment holder system (portadipper systems). The general purpose of the present invention, which will be described subsequently in greater detail is to provide a portable condiment holder system for holding ketchup, dipping sauce and similar condiments, with the receptacle (portable condiment holder assembly) configured to be worn over the fingers via a sturdy dual ring attachment. Design intent is to provide consumers a simple means of coating "finger foods" such as French fries, chicken nuggets, vegetables and the like, in delicious condiments, without risking spilling the condiment on the person or other belongings, particularly when on the go.

A portable condiment holder system is disclosed herein, in a preferred embodiment, comprising: a portable condiment holder assembly including, a lid; a receptacle having a top portion, a bottom portion, a first finger mount coupled to the bottom portion sized to accommodate a middle finger on a hand of a user-consumer, a second finger mount coupled to the bottom portion sized to accommodate an index finger on the hand of the user-consumer, an inner-volume to store at least one condiment and at least one finger food; and a base comprising at least one slit. The lid, the receptacle, and the base form the portable condiment holder assembly. The portable condiment holder assembly permits the user-consumer to coat at least one finger food in the at least one condiment, without risking spilling the condiment on the user-consumer and on belongings while in in-use condition.

The portable condiment holder assembly preferably comprises shatterproof BPA-free plastic material so as to prevent breakage of the portable condiment holder assembly if dropped. The portable condiment holder assembly is re-usable and dishwasher-safe once the portable condiment holder assembly is no longer in the in-use condition. The portable condiment holder assembly is oval in-shape to permit the portable condiment holder assembly to fit on the middle finger and the index finger of the user-wearer and not impede hand-function. The portable condiment holder assembly is approximately 4-inches in length and 2-inches in width. The inner-volume of portable condiment holder assembly is approximately 1½-inches in depth to accommodate at least one finger food.

The lid is removably-coupled to the top portion of the receptacle. The lid is removably-coupled to the top portion via snap-fitting to secure the at least one condiment inside the portable condiment holder assembly during travel. The lid comprises at least one hinge to permit the lid to not become misplaced when removed.

The bottom portion is flat to permit the receptacle of the portable condiment assembly to be horizontal and rest over a knuckle and lower joint of the index finger and over a knuckle and lower joint of the middle finger when on the hand of the user-consumer in the in-use condition. The first finger mount and the second finger mount permit the user-consumer to portably store the at least one condiment while on-the-go. The first finger mount and the second finger mount are coupled to one another. The first finger mount and the second finger mount may be injection molded together. The first finger mount and the second finger mount are positioned side-by side relative to one another length-wise. The first finger mount and the second finger mount are adjustable to accommodate different circumferences of the index finger and the middle finger of the user-consumer.

The base when in the non-use condition is removably-coupled to the first finger mount and the second finger mount located on the bottom portion of the receptacle and is dimensioned to fit inside of a cup-holder inside of a vehicle thereby securing the portable condiment holder assembly in an upright position. The base is cylindrical in shape and tapers downward relative to the slit. The base is flexible and comprises at least one spring. The slit located on the base is dimensioned to fit the at least 2 finger mounts on the receptacle thereby creating a flat surface when in a non-use condition.

A kit is also described herein for manufacture and for sale of portable condiment holder system including a plurality of the portable condiment holder assemblies in various sizes and various sized first finger mount and second finger mounts; and a set of user-instructions.

A method of using a portable condiment holder system comprises the steps of: choosing a portable condiment holder assembly having a first finger mount and a second finger mount that fit over a middle finger and an index finger of a user-consumer; opening a lid on the portable condiment holder assembly; inserting the portable condiment holder assembly on to the middle finger and the index finger on a hand of the user-consumer via the first finger mount and the second finger mount; pouring at least one condiment into a receptacle of the portable condiment holder assembly; dipping at least one finger food into the condiment located in the receptacle; placing the lid back on to the portable condiment holder assembly; removing the portable condiment holder assembly from the hand of the user-consumer; placing the portable condiment holder assembly on to a base via at least one slit; and washing the portable condiment holder assembly for future use.

The present invention holds significant improvements and serves as a portable condiment holder system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, portable condiment holder system (portadipper systems), constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to condiment holder devices and more specifically relates to a portable condiment holder system (portadipper systems) for holding ketchup, dipping sauce and similar condiments, with the receptacle (portable condiment holder assembly) configured to be worn over the fingers via a sturdy dual ring attachment means.

Generally speaking, Finger Dipper Condiment Holder (Portadipper systems) is a specially designed receptacle, inside of which condiments such as ketchup, ranch dressing, barbecue sauce and similar dips can be neatly stored and easily accessed.

This device may be worn over the fingers and comfortably secured to the top of the hand via an integrated, dual-ring fastener. Also included with the Finger Dipper Condiment Holder may be a sturdy support stand for use in placing the device directly on the ground or other flat surface areas. The Finger Dipper Condiment Holder may be manufactured of sturdy, shatterproof plastic material.

Generally oval in shape, the Finger Dipper Condiment Holder may measure approximately 4 inches in total length, 2 inches in width, with interior of the receptacle measuring approximately 1½ inches in depth. The top of the unit may comprise an ample opening, sized appropriately to accommodate larger snack foods such as chicken strips, apple slices and the like. A snap fitted, leak-proof hinged lid may be incorporated into the design of the unit for use in safely containing contents within the device during transport. As mentioned, the Finger Dipper Condiment Holder is designed to be worn over the fingers in a similar manner as a ring. As such, the underside of the receptacle may be flat, with the unit resting over the knuckles and lower joints of the fingers during wear. Two, ring-like fasteners may be mounted to the underside of the unit, positioned side by side to one another. These rings may be universal in size, or adjustable to accommodate different wearers. In either case, these rings may accommodate the index and middle finger, respectively.

Also included for use with the Finger Dipper Condiment Holder may be a sturdy support stand, with the top of the stand boasting a slotted opening inside of which the rings may be inserted, thus securing the Holder upright. This stand may be generally cylindrical in shape, tapering inwards towards the top of the unit. The Finger Dipper Condiment Holder may be offered for sale individually or in multi-count packages for general consumer use.

Use of the Finger Dipper Condiment Holder may be relatively simple and straight forward. Consumers may simply purchase one or more Finger Dipper Condiment Holders to keep on hand in the home, or even in a vehicle glove compartment or cup holder for use when needed on the go. For instance, a homemaker packing a child's school lunch might fill the Finger Dipper Condiment Holder with ranch dressing and secure the unit closed via the included snap fitted lid. In this manner, the child may enjoy a tasty dip for carrot slices and celery stalks. Alternately, a coed grabbing a quick lunch at the drive-thru before class may grab a Finger Dipper Condiment Holder from their glove compartment or cup holder, pouring ketchup directly within for use in dunking their French fries when seated behind the wheel. The user may then slide the Finger Dipper Condiment Holder over their index and middle finger in order to secure the unit upright, on top of their hand. Alternately, the user might choose to employ the included stand, inserting the Finger Dipper Condiment Holder into the stand and setting the stand on any flat surface. Thus filled, the user may simply dip the designated finger food directly into the Finger Dipper Condiment Holder, coating the food with a delectable condiment of one's own choosing. After use, the unit may be washed clean and stored away until again needed, or simply discarded in any trash receptacle.

The Finger Dipper Condiment Holder may provide consumers a simple and practical means of enjoying their favorite condiments when on the go. A receptacle configured specifically to be worn on the hand, the Finger Dipper Condiment Holder may provide reliable storage and easy access to condiments such as ketchup, barbecue sauce, ranch dressing, caramel, hot mustard and other dips; securing these sauces in a stable, steady and upright position, thus effectively preventing messy spills when on the go. In this manner, one can comfortably enjoy their favorite finger foods when seated behind the wheel of their car, enjoying a picnic lunch, or even snacking at the ballpark. Eliminating the frustrating spills that can stain clothing and upholstery, as well as result in a ruined meal, the Finger Dipper Condiment Holder may readily improve on the go dining.

Featuring an attachable stand, the Finger Dipper Condiment Holder can also be utilized on virtually any flat surface, thus enabling the user to utilize the device in a hands free manner. Well-suited for use when traveling or dining away from home, the Finger Dipper Condiment Holder may also prove ideal for daily use. Whether enjoying a snack of salsa and tortilla chips when watching a late night movie, or even crunching on some celery and peanut butter before retiring for bed, the Finger Dipper Condiment Holder may enable the user to enjoy their favorite finger foods and condiments, with ease.

Figure 1:
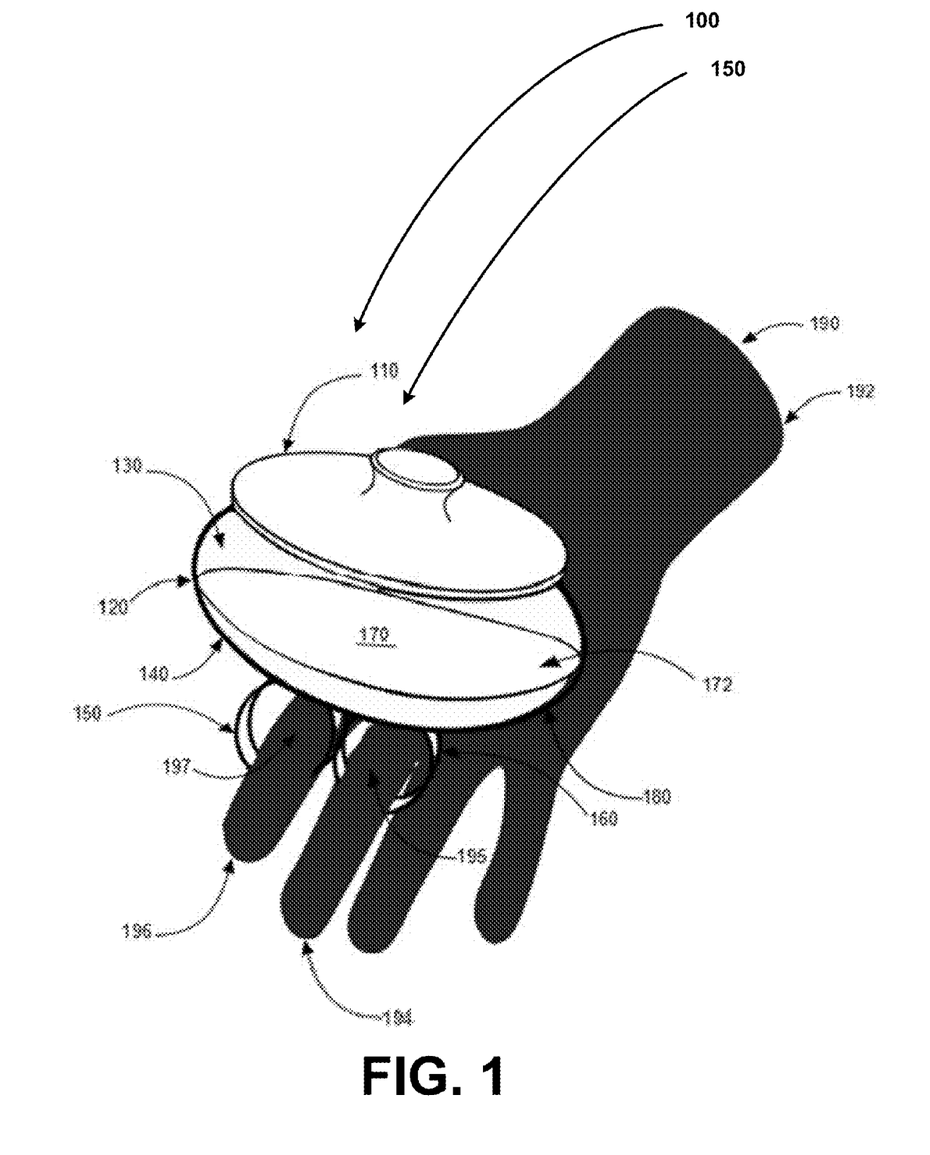
FIG. 1 shows a perspective view illustrating a portable condiment holder system in an in-use condition according to an embodiment of the present invention.

Referring to the drawings by numerals of reference there is shown in FIG. 1 a perspective view illustrating portable condiment holder system 100 in in-use condition 106 according to an embodiment of the present invention.

Portable condiment holder system 100 in a preferred embodiment comprises: portable condiment holder assembly 102 including lid 110; receptacle 120 having top portion 130, bottom portion 140, first finger mount 150 coupled to bottom portion 140 sized to accommodate middle finger 194 on hand 192 of user-consumer 190, second finger mount 160 also coupled to bottom portion 140 sized to accommodate index finger 196 on hand 192 of user-consumer 190, inner-volume 170 to store at least one condiment 172 and at least one finger food 176; and base 180 comprising at least one slit 184. Lid 110, receptacle 120, and base 180 preferably form portable condiment holder assembly 102. Portable condiment holder assembly 102 permits user-consumer 190 to coat at least one finger food 176 in at least one condiment 172, without risking spilling condiment 172 on user-consumer 190 and on belongings while in in-use condition 106.

Figure 2:
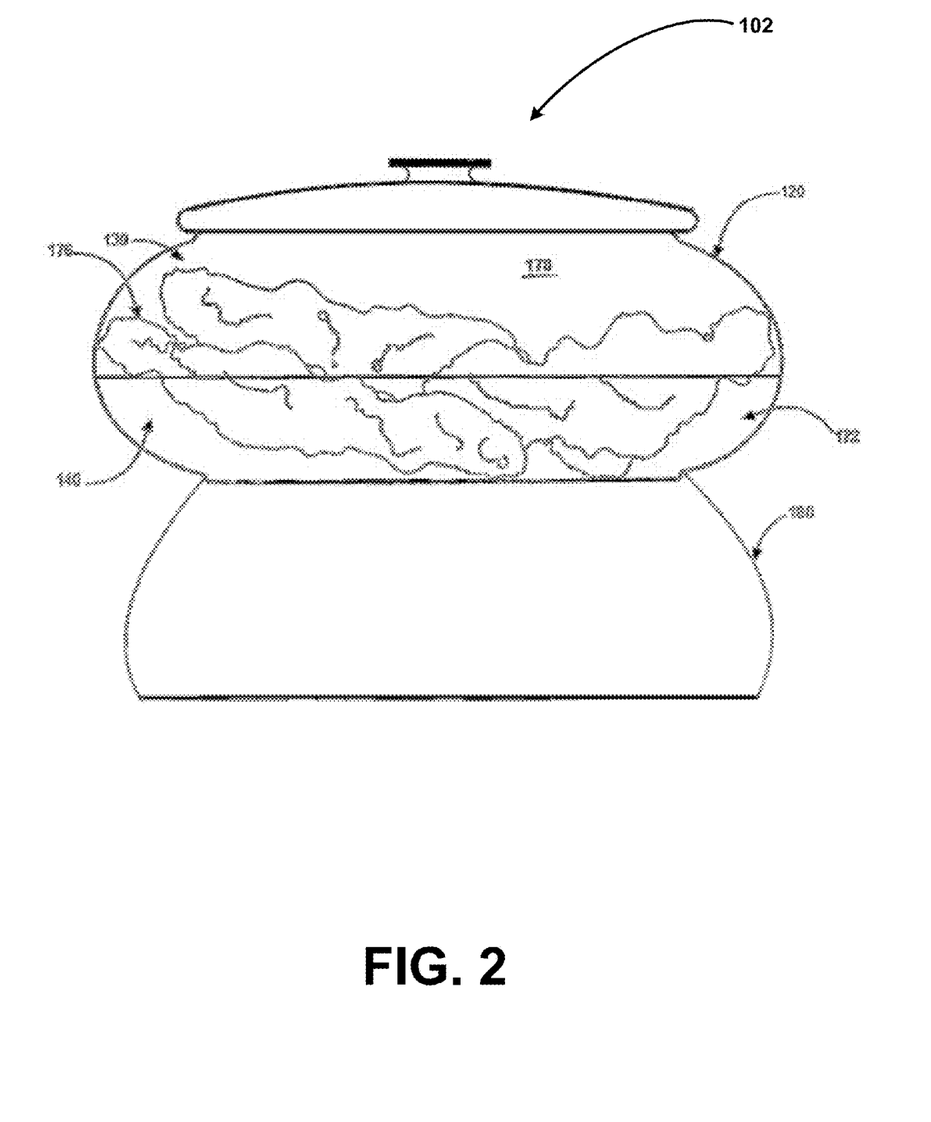
FIG. 2 is a front perspective view illustrating a portable condiment holder assembly of the portable condiment holder system a according to an embodiment of the present invention of FIG. 1.
Figure 3:
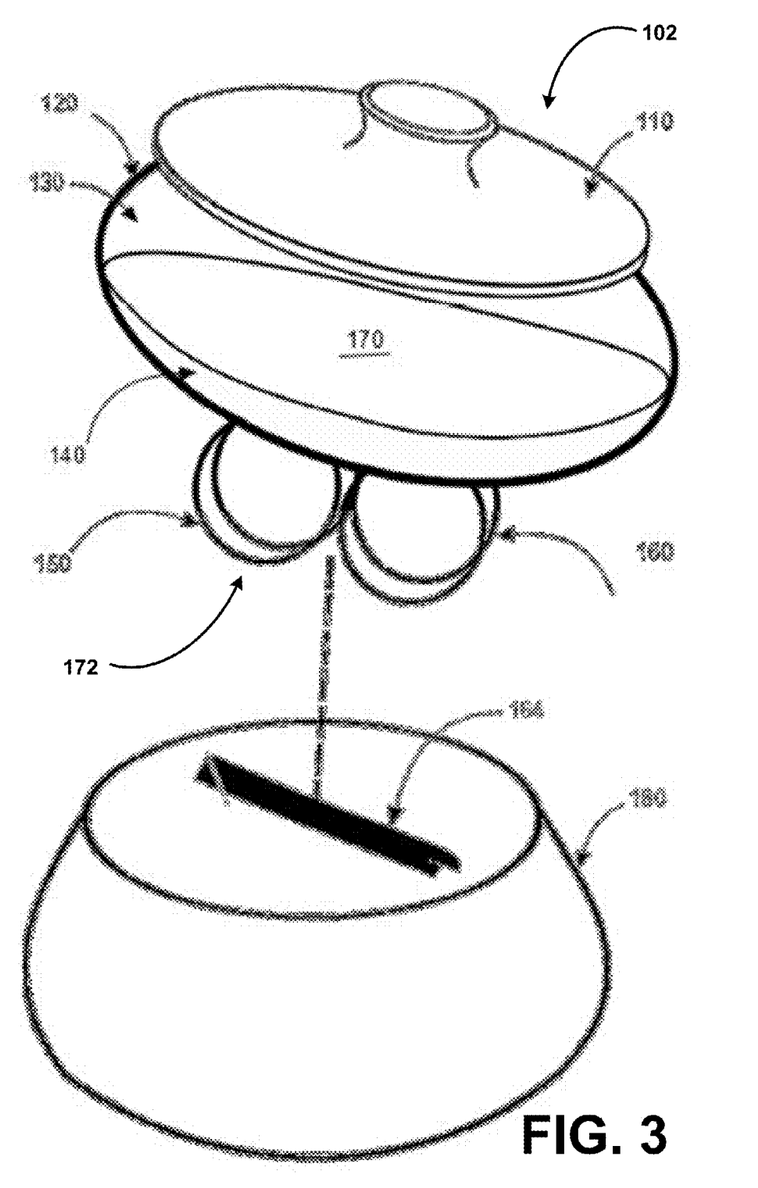
FIG. 3 is another perspective view illustrating the portable condiment holder assembly of the portable condiment holder system according to an embodiment of the present invention of FIG. 1.
Figure 4:
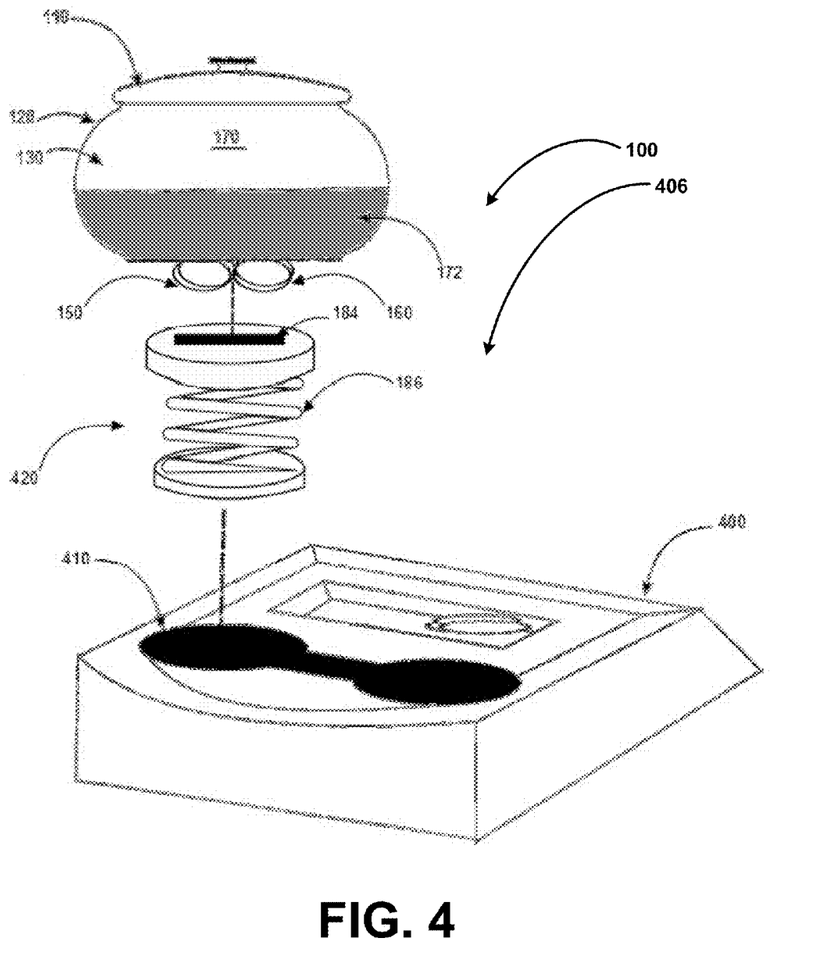
FIG. 4 is perspective view illustrating the portable condiment holder assembly in a non-use condition in a cup holder in a vehicle of the portable condiment holder system according to an embodiment of the present invention of FIG. 1.

Referring now to FIGS. 2-4 showing perspective views illustrating portable condiment holder assembly 102 of portable condiment holder system 100 a according to an embodiment of the present invention of FIG. 1

Portable condiment holder assembly 102 is preferably re-usable and dishwasher-safe once portable condiment holder assembly 102 is no longer in in-use condition 106. It should be noted that disposable versions of portable condiment holder system 100 may be manufactured for future use. Portable condiment holder assembly 102 comprises shatterproof BPA-free plastic material so as to prevent breakage of portable condiment holder assembly 102 if dropped. Upon reading this specification, it should be appreciated that, under appropriate circumstances, considering such issues as user preferences, design preference, structural requirements, marketing preferences, cost, available materials, technological advances, etc., other material arrangements such as, for example, other plastic material, rubber, metal, etc., may be sufficient.

Portable condiment holder assembly 102 is preferably oval in-shape to permit the portable condiment holder assembly 102 to fit on middle finger 194 and index finger 196 of user-wearer 190 and not impede hand-function, yet maintain a 'pseudo balanced condition'. However, it should be noted that other shapes may be used for portable condiment holder assembly 102. Portable condiment holder assembly 102 is approximately 4-inches in length and 2-inches in width. Inner-volume 170 of portable condiment holder assembly 102 is approximately 1½-inches in depth to accommodate at least one finger food 176.

Lid 110 is preferably removably-couplable to top portion 130 of receptacle 120. Lid 110 is removably-coupled to top portion 130 via snap-fitting (or other suitable means) to secure at least one condiment 172 inside portable condiment holder assembly 102 during travel. Lid 110 may comprise at least one hinge (not shown) to permit lid 110 to not become misplaced when removed.

Bottom portion 140 is flat to permit receptacle 120 of portable condiment assembly 102 to be horizontal and rest over knuckle 197 and lower joint of index finger 196 and over knuckle 195 and lower joint of middle finger 194 when on hand 192 of user-consumer 190 in in-use condition 106 as shown in FIG. 1. First finger mount 150 and second finger mount 160 permit user-consumer 190 to portably store at least one condiment 172 while on-the-go. First finger mount 150 and second finger mount 160 are coupled to one another. First finger mount 150 and second finger mount 160 are injection molded together. First finger mount 150 and second finger mount 160 are positioned side-by side relative to one another (lengthwise, as shown). Further, first finger mount 150 and second finger mount 160 may be adjustable to accommodate different circumferences of index finger 196 and middle finger 194 of user-consumer 190. First finger mount 150 and second finger mount 160 may also be non-adjustable in certain embodiments.

Base 180 when in non-use condition 406 is removably-coupled to first finger mount 150 and second finger mount 160 located on bottom portion 140 of receptacle 120 and is dimensioned to fit inside of cup-holder 410 inside of vehicle 400 thereby securing the portable condiment holder assembly 102 in up-right position 420 as shown in FIG. 4. Base 180 is preferably cylindrical in shape and tapers downward relative to slit 184. Base 180 is flexible and comprises at least one spring 186 in some embodiments. Slit located on the base is dimensioned to fit first finger mount 150 and second finger mount 160 on receptacle 120 thereby creating a flat surface when in non-use condition 406.

The kit (not shown) for manufacture and for sale of portable condiment holder system 100 includes a plurality of the portable condiment holder assemblies 102 in various sizes and various sized first finger mount 150 and second finger mounts 160; and a set of user-instructions. The kit has instructions such that functional relationships are detailed in relation to the structure of the invention (such that the invention can be used, maintained, or the like in a preferred manner). Portable condiment holder system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, different scent combinations, parts may be sold separately, etc., may be sufficient.

Figure 5:
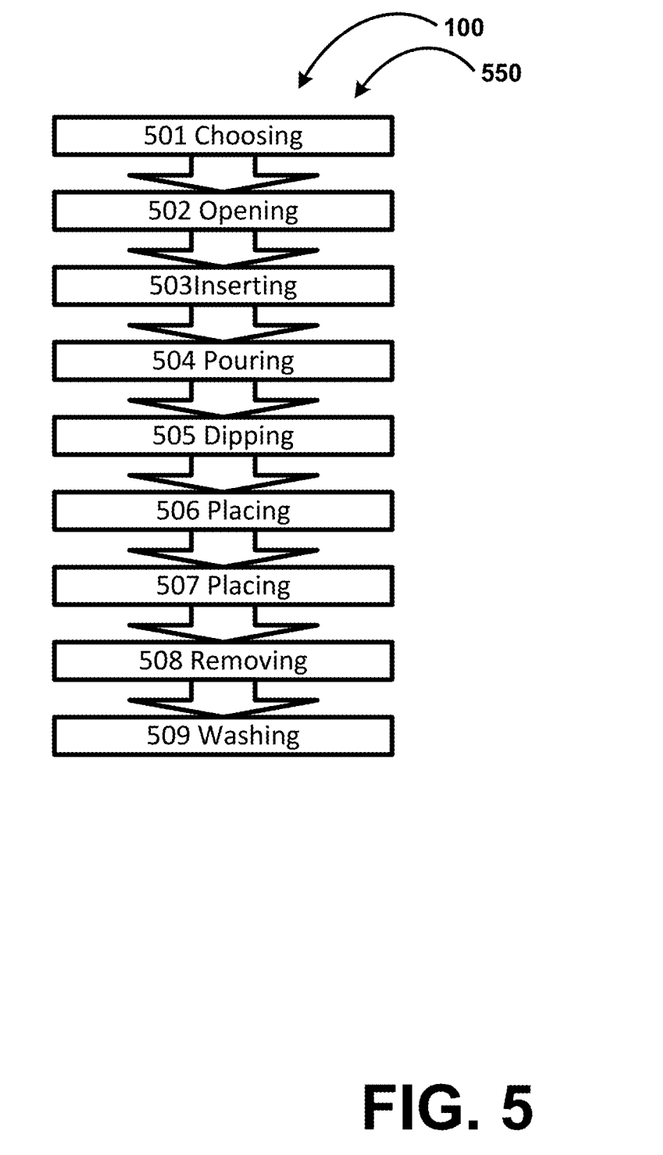
FIG. 5 is a flowchart illustrating a method of use for the portable condiment holder system according to an embodiment of the present invention of FIGS. 1-4.

Referring now to FIG. 5, flowchart 550 illustrating method of use 500 for portable condiment holder system 100 according to an embodiment of the present invention of FIGS. 1-4.

Method of use 500 of portable condiment holder system 100 preferably comprises the steps of: step one 501 choosing portable condiment holder assembly 102 having first finger mount 150 and second finger mount 160 that fit over middle finger 194 and index finger 196 of user-consumer 190; step two 502 opening lid 110 on portable condiment holder assembly 102; step three 503 inserting portable condiment holder assembly 102 on to middle finger 194 and index finger 196 on hand 192 of user-consumer 190 via first finger mount 150 and second finger mount 160; step four 504 pouring at least one condiment 172 into receptacle 120 of portable condiment holder assembly 102; step five 505 dipping at least one finger food 176 into condiment 172 located in receptacle 120; step six 506 placing lid 110 back on to portable condiment holder assembly 102; step seven 507 removing portable condiment holder assembly 102 from hand 192 of user-consumer 190; step eight 508 placing portable condiment holder assembly 102 on to base 180 via at least one slit 184; and step nine 509 washing the portable condiment holder assembly 102 for future use.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A portable condiment holder system comprising:
a portable condiment holder assembly including,
   a lid;
   a receptacle having,
      a top portion,
      a bottom portion that is flat,
      a first finger mount coupled to said bottom portion sized to accommodate a ring finger on a hand of a user-consumer;
      a second finger mount coupled to said bottom portion sized to accommodate an index finger on said hand of said user-consumer;
      an inner-volume to store at least one said condiment and at least one finger food; and
   a base comprising a top surface with at least one slit and said top surface is flat and said top surface is contact with said bottom flat portion of said receptacle thereby creating a flush-mount between said receptacle and said base;
wherein said first finger mount and said second finger mount are located in said at least one slit of said top surface of said base; wherein said lid, said receptacle, and said base form said portable condiment holder assembly;
wherein said lid is removably-coupled to said top portion of said receptacle;
wherein said first finger mount and said second finger mount permit said user-consumer to portably store said at least one condiment while on-the-go;
wherein said first finger mount and said second finger mount are coupled to one another;
wherein said at least one slit is dimensioned to fit at least said first finger mount and said second finger mount; and
wherein said receptacle is capable of being removed from said base and coupled to said user-consumer and when said receptacle is removed from said base and coupled to said user-consumer, said portable condiment holder assembly permits said user-consumer to coat at least one finger food in said at least one condiment, without risking spilling said condiment on said user-consumer and on belongings while in an in-use condition.

2. The portable condiment holder system of claim 1 wherein said portable condiment holder assembly comprises shatterproof BPA-free plastic material so as to prevent breakage of said portable condiment holder assembly if dropped.

3. The portable condiment holder system of claim 2 wherein said portable condiment holder assembly is re-usable and dishwasher safe once said portable condiment holder assembly is no longer in said in-use condition.

4. The portable condiment holder system of claim 2 wherein said portable condiment holder assembly is oval in-shape to permit said portable condiment holder assembly to fit on said ring finger and said index finger of said user-consumer and not impede hand-function.

5. The portable condiment holder system of claim 4 wherein said portable condiment holder assembly is approximately 4-inches in length.

6. The portable condiment holder system of claim 4 wherein said portable condiment holder assembly is approximately 2-inches in width.

7. The portable condiment holder system of claim 4 wherein said inner-volume of portable condiment holder assembly is approximately 1½-inches in depth to accommodate at least one said finger food.

8. The portable condiment holder system of claim 1 wherein said lid is removably-coupled to said top portion via snap-fitting to secure said at least one condiment inside said portable condiment holder assembly during travel.

9. The portable condiment holder system of claim 8 wherein said lid comprises at least one hinge to permit said lid to not become misplaced when removed.

10. The portable condiment holder system of claim 1 wherein said flat bottom portion permits said receptacle of said portable condiment assembly to be horizontal and rest over a knuckle and lower joint of said index finger and over a knuckle and lower joint of said ring finger when on said hand of said user-consumer in said in-use condition.

11. The portable condiment holder system of claim 1 wherein said first finger mount and said second finger mount are injection molded together.

12. The portable condiment holder system of claim 1 wherein said first finger mount and said second finger mount are positioned side-by side relative to one another.

13. The portable condiment holder system of claim 1 wherein said first finger mount and said second finger mount are non-adjustable.

14. The portable condiment holder system of claim 1 wherein said first finger mount and said second finger mount are adjustable to accommodate different circumferences of said index finger and said ring finger of said user-consumer.

15. The portable condiment holder system of claim 1 wherein said base is removably-coupled to said first finger mount and said second finger mount located on said bottom portion of said receptacle and is dimensioned to fit inside of a cup-holder inside of a vehicle thereby securing said portable condiment holder assembly in an up-right position.

16. The portable condiment holder system of claim 15 wherein said base is cylindrical in shape and tapers downward relative to said slit.

17. The portable condiment holder system of claim 15 wherein said base is flexible and comprises at least one spring.

18. A portable condiment holder system comprising:
a portable condiment holder assembly including,
    a lid;
    a receptacle having,
        a top portion,
        a bottom portion that is flat,
        a first finger mount coupled to said bottom portion sized to accommodate a middle finger on a hand of a user-consumer;
        a second finger mount coupled to said bottom portion sized to accommodate an index finger on said hand of said user-consumer;
        an inner-volume to store at least one said condiment and at least one finger food; and
    a base comprising a top surface with at least one slit and said top surface is flat and said top surface is contact with said bottom flat portion of said receptacle thereby creating a flush-mount between said receptacle and said base; wherein said first finger mount and said second finger mount are located in said at least one slit of said top surface of said base; wherein said lid
said receptacle, and said base form said portable condiment holder assembly;
wherein said portable condiment holder assembly comprises shatterproof BPA-free plastic material so as to prevent breakage of said portable condiment holder assembly if dropped;
wherein said portable condiment holder assembly is re-usable and dishwasher safe once said portable condiment holder assembly is no longer in an in use-condition;
wherein said portable condiment holder assembly is oval in-shape to permit said portable condiment holder assembly to fit on said middle finger and said index finger of said user-consumer and not impede hand-function;
wherein said portable condiment holder assembly is approximately 4-inches in length;
wherein said portable condiment holder assembly is approximately 2-inches in width;
wherein said inner-volume of portable condiment holder assembly is approximately 1½-inches in depth to accommodate at least one said snack food;
wherein said lid is removably-coupled to said top portion of said receptacle;
wherein said lid is removably-coupled to said top portion via snap-fitting to secure said at least one condiment inside said portable condiment holder assembly during travel;
wherein said lid comprises at least one hinge to permit said lid to not become misplaced when removed;
wherein said flat bottom portion permits said receptacle of said portable condiment assembly to be horizontal and rest over a knuckle and lower joint of said index finger and over a knuckle and lower joint of said middle finger when on said hand of said user-consumer in said in-use condition;
wherein said first finger mount and said second finger mount permit said user-consumer to portably store said at least one condiment while on-the-go;
wherein said first finger mount and said second finger mount are coupled to one another;
wherein said first finger mount and said second finger mount are injection molded together;
wherein said first finger mount and said second finger mount are positioned side-by side relative to one another;
wherein said first finger mount and said second finger mount are adjustable to accommodate different circumferences of said index finger and said ring finger of said user-consumer;
wherein said base is removably-coupled to said first finger mount and said second finger mount located on said bottom portion of said receptacle and is dimensioned to fit inside of a cup-holder inside of a vehicle thereby securing said portable condiment holder assembly in an up-right position;
wherein said base is cylindrical in shape and tapers downward relative to said slit;
wherein said base is flexible and comprises at least one spring;
wherein said at least one slit is dimensioned to fit at least said first finger mount and said second finger mount; and
wherein said receptacle is capable of being removed from said base and coupled to said user-consumer and when said receptacle is removed from said base and coupled to said user-consumer, said portable condiment holder assembly permits said user-consumer to coat at least one finger food in said at least one condiment, without risking spilling said condiment on said user-consumer and on belongings while in an in-use condition.

19. The portable condiment holder system of claim 18 further comprising a kit, wherein said kit comprises: a plurality of said portable condiment holder assemblies in various sizes and various sized first finger mount and second finger mounts; and a set of user-instructions.

* * * * *